(12) United States Patent
Karaoguz

(10) Patent No.: US 8,705,564 B2
(45) Date of Patent: *Apr. 22, 2014

(54) MULTI-NETWORK SHARED PHY LAYER

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/433,003

(22) Filed: Mar. 28, 2012

(65) Prior Publication Data

US 2012/0182955 A1    Jul. 19, 2012

Related U.S. Application Data

(63) Continuation of application No. 11/829,276, filed on Jul. 27, 2007, now Pat. No. 8,149,867.

(60) Provisional application No. 60/887,228, filed on Jan. 30, 2007.

(51) Int. Cl.
*H04J 3/16* (2006.01)
*H04J 3/22* (2006.01)

(52) U.S. Cl.
USPC .......................................... 370/466; 370/467

(58) Field of Classification Search
USPC .......................................... 370/465, 466, 467
See application file for complete search history.

(56) References Cited

U.S. PATENT DOCUMENTS

| | | | |
|---|---|---|---|
| 7,015,800 B2 | 3/2006 | Lesesky et al. | |
| 7,133,416 B1 | 11/2006 | Chamdani et al. | |
| 7,209,455 B2 | 4/2007 | Yee et al. | |
| 7,293,110 B2 | 11/2007 | Dowling | |
| 2002/0048368 A1* | 4/2002 | Gardner | 380/277 |
| 2003/0123417 A1* | 7/2003 | Bysted et al. | 370/337 |
| 2004/0240486 A1* | 12/2004 | Venkatesh et al. | 370/537 |
| 2005/0157823 A1 | 7/2005 | Sudhakar | |
| 2005/0180381 A1* | 8/2005 | Retzer et al. | 370/349 |
| 2005/0215287 A1 | 9/2005 | Efland et al. | |
| 2006/0129724 A1 | 6/2006 | Kostadinov | |
| 2006/0191001 A1 | 8/2006 | Winter | |
| 2006/0208873 A1* | 9/2006 | Lesesky et al. | 340/531 |
| 2006/0271562 A1* | 11/2006 | Kato | 707/10 |
| 2007/0064738 A1 | 3/2007 | Takagi et al. | |
| 2007/0071006 A1* | 3/2007 | Bosch et al. | 370/392 |
| 2007/0147425 A1* | 6/2007 | Lamoureux et al. | 370/469 |

(Continued)

FOREIGN PATENT DOCUMENTS

EP    1199842    4/2002

*Primary Examiner* — Farah Faroul
(74) *Attorney, Agent, or Firm* — Brinks Gilson & Lione

(57) ABSTRACT

A system and method is provided for processing a physical ("PHY") layer signal. Various aspects of the present invention may comprise receiving a PHY layer signal, analyzing a non-content characteristic of the PHY layer signal, and determining a communication protocol associated with the PHY layer signal. The PHY layer signal may be processed according to the communication protocol to obtain a processed PHY layer signal. In one embodiment, when the communication protocol is a first communication protocol, the PHY layer signal may be processed according to the first communication protocol. When the communication protocol is a second communication protocol, the PHY layer signal may be processed according to the second communication protocol. The processed PHY layer signal may be outputted.

19 Claims, 6 Drawing Sheets

(56) References Cited

U.S. PATENT DOCUMENTS

| | | | |
|---|---|---|---|
| 2007/0147486 A1* | 6/2007 | Labs et al. | 375/222 |
| 2007/0183461 A1 | 8/2007 | Eyal et al. | |
| 2007/0184835 A1 | 8/2007 | Bitran | |
| 2007/0253427 A1* | 11/2007 | Stirbu | 370/395.21 |
| 2008/0192661 A1* | 8/2008 | Hamamoto et al. | 370/310 |
| 2008/0246842 A1* | 10/2008 | Inoue | 348/143 |
| 2009/0327546 A1 | 12/2009 | Guri et al. | |
| 2010/0067585 A1* | 3/2010 | Cai et al. | 375/256 |

\* cited by examiner

US 8,705,564 B2

MULTI-NETWORK SHARED PHY LAYER

CROSS-REFERENCE TO RELATED APPLICATIONS/INCORPORATION BY REFERENCE

The present application is a continuation of U.S. patent application Ser. No. 11/829,276, filed Jul. 27, 2007, and titled "MULTI-NETWORK SHARED PHY LAYER," the contents of which are incorporated herein by reference in their entirety, which is related to and claims priority from U.S. Provisional Patent Application Ser. No. 60/887,228, filed Jan. 30, 2007, and titled "MULTI-NETWORK SHARED PHY LAYER," the contents of which are incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In a dynamic network environment, a communication system (e.g., a portable communication system) may move in and out of coverage areas associated with a plurality of different communication networks of different respective types. Present communication systems (e.g., portable communication systems) do not efficiently provide the capability for communicating effectively in such a dynamic network environment.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method in a communication device (e.g., a mobile communication device) for efficiently providing PHY layer communications in a multi-network environment, substantially as shown in and/or described in connection with at least one of the figures, as set forth more completely in the claims. These and other advantages, aspects and novel features of the present invention, as well as details of illustrative aspects thereof, will be more fully understood from the following description and drawings

DETAILED DESCRIPTION OF VARIOUS ASPECTS OF THE INVENTION

Various aspects of the present invention will be presented in the context of Physical ("PHY") layer processing circuitry of a communication system. Though various characteristics of the present invention are particularly advantageous when applied to mobile communication systems, unless explicitly claimed, the scope of various aspects of the present invention should not be limited by characteristics of mobile communication systems. Such mobile communication systems may, for example and without limitation, comprise a mobile telephone, cellular telephone, handheld computer, personal digital assistant, portable email device, portable music player with network communication capability, networked mobile computer user interface device, etc.

Figure 1:
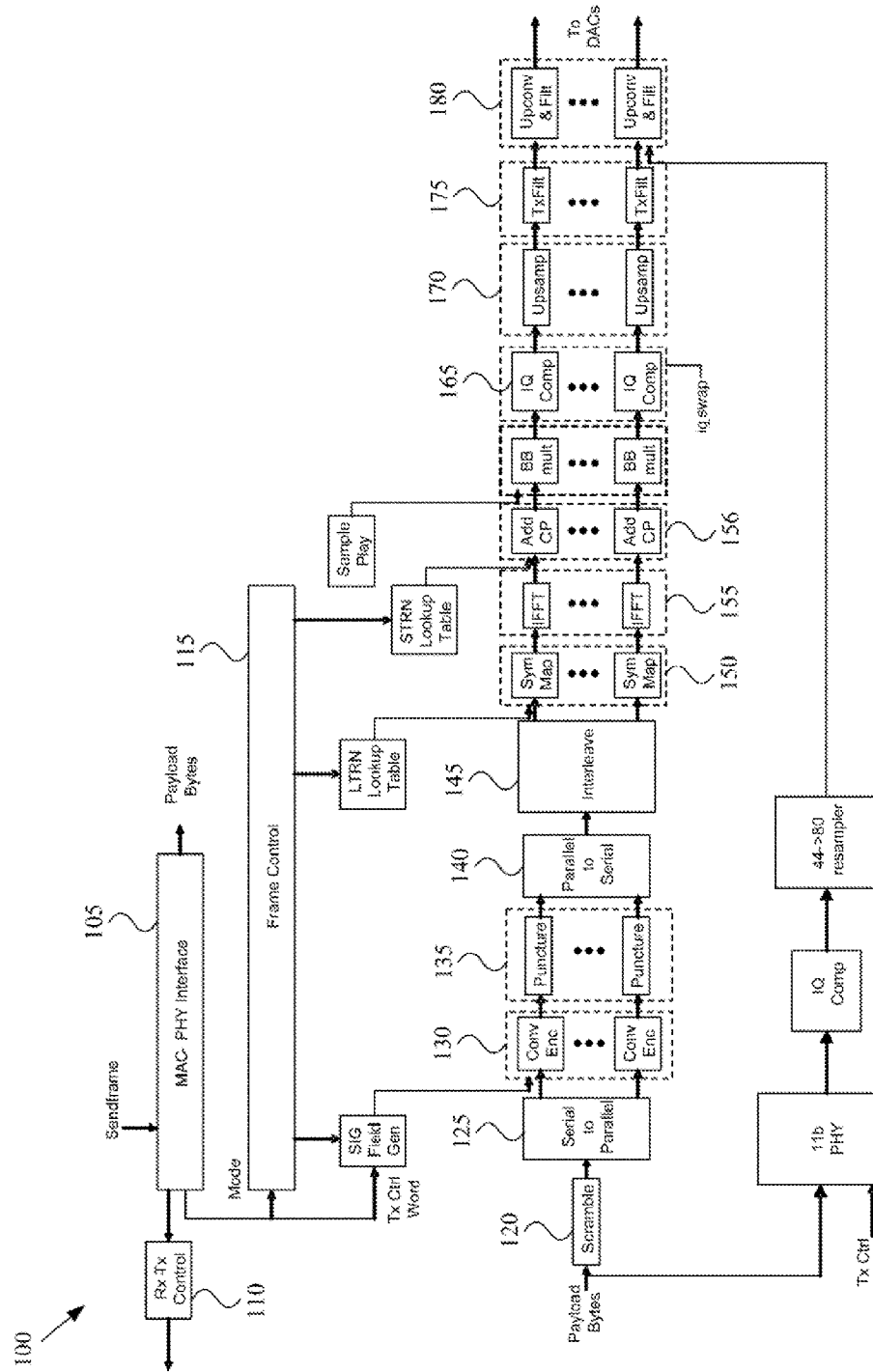
FIG. 1 is a diagram illustrating an exemplary block diagram of a portion of a Multiple Input Multiple Output ("MIMO") transmitter circuit.

FIG. 1 is a diagram illustrating an exemplary block diagram of a portion of a transmitter circuit 100. Such a transmitter circuit 100 may, for example and without limitation, be utilized in a Multiple Input Multiple Output ("MIMO") communication system. Various aspects of the present invention may, for example, be readily incorporated into the exemplary transmitter circuit 100.

For illustrative purposes, the following discussion will refer to various portions of the exemplary transmitter circuit 100. It should be noted that unless explicitly claimed, the configuration of the exemplary transmitter circuit 100 should not limit the scope of various aspects of the present invention. As a non-limiting example, though the exemplary transmitter circuit 100 may be utilized in a MIMO communication system, the scope of various aspects of the present invention should not be limited by particular characteristics associated with MIMO communication circuits.

The exemplary transmitter circuit 100 comprises a variety of modules that operate primarily to perform various respective signal processing operations. For example, the exemplary transmitter circuit 100 comprises a MAC-PHY Interface module 105 that, for example, operates at the interface between Medium Access Control ("MAC") layer circuitry and Physical ("PHY") layer circuitry. The exemplary MAC-PHY interface module 105 is coupled to an Rx-Tx controller module 110. The MAC-PHY interface module 105 may, for example, output Payload Bytes, a Mode signal, and a Tx Control Word. A frame control module 115 may receive the mode control signal from the MAC-PHY interface module 105 and may generally operate to manage the generation of transmission frames for the PHY layer circuitry. Such transmission frames may, for example, comprise a header/preamble portion and a payload portion.

The frame control module 115 may, for example, operate to control operation of various other modules that operate to provide frame information (e.g., information for a preamble signal field, long training sequence number fields, short training sequence number fields, etc.). As illustrated in FIG. 1, such various modules may be adapted to contribute their respective information at various points in the signal processing path of the transmitter circuitry 100.

The exemplary transmitter 100 may, for example, comprise a scrambling module 120 that operates to perform a scrambling signal processing operation on payload data. Such data may then be parallelized by a serial-to-parallel converter module 125. A convolutional encoder module 130 may then perform an encoding signal processing operation on the data, and a puncturer module 135 may perform a puncturing signal processing operation on the encoded data. A parallel-to-serial converter module 140 may then perform a serialization signal processing operation on the punctured data, and the interleaver module 145 may perform an interleaving signal processing operation on the serialized data, outputting interleaved parallel streams of data.

A symbol mapper module 150 may then perform a mapping (e.g., constellation mapping) signal processing operation on the interleaved data, and an Inverse Fast Fourier Transform ("IFFT") module 155 may then perform an IFFT signal processing operation on the parallel streams of mapped data to convert such streams into time domain signals. The exemplary transmitter circuit 100 may also comprise a cyclic prefix module 156 that performs a signal processing operation on the time domain data to add a cyclic prefix. The exemplary transmitter circuit 100 may also comprise other signal processing modules, including for example, an I-Q modulator module 165, upsampler module 170, transmit filter module 175 and/or upconverter module 180, each of which primarily perform respective signal processing operations on the signal(s) to be transmitted. The output of the exemplary transmitter circuit 100 may, for example, be coupled to a digital-to-analog converter module.

Figure 2:
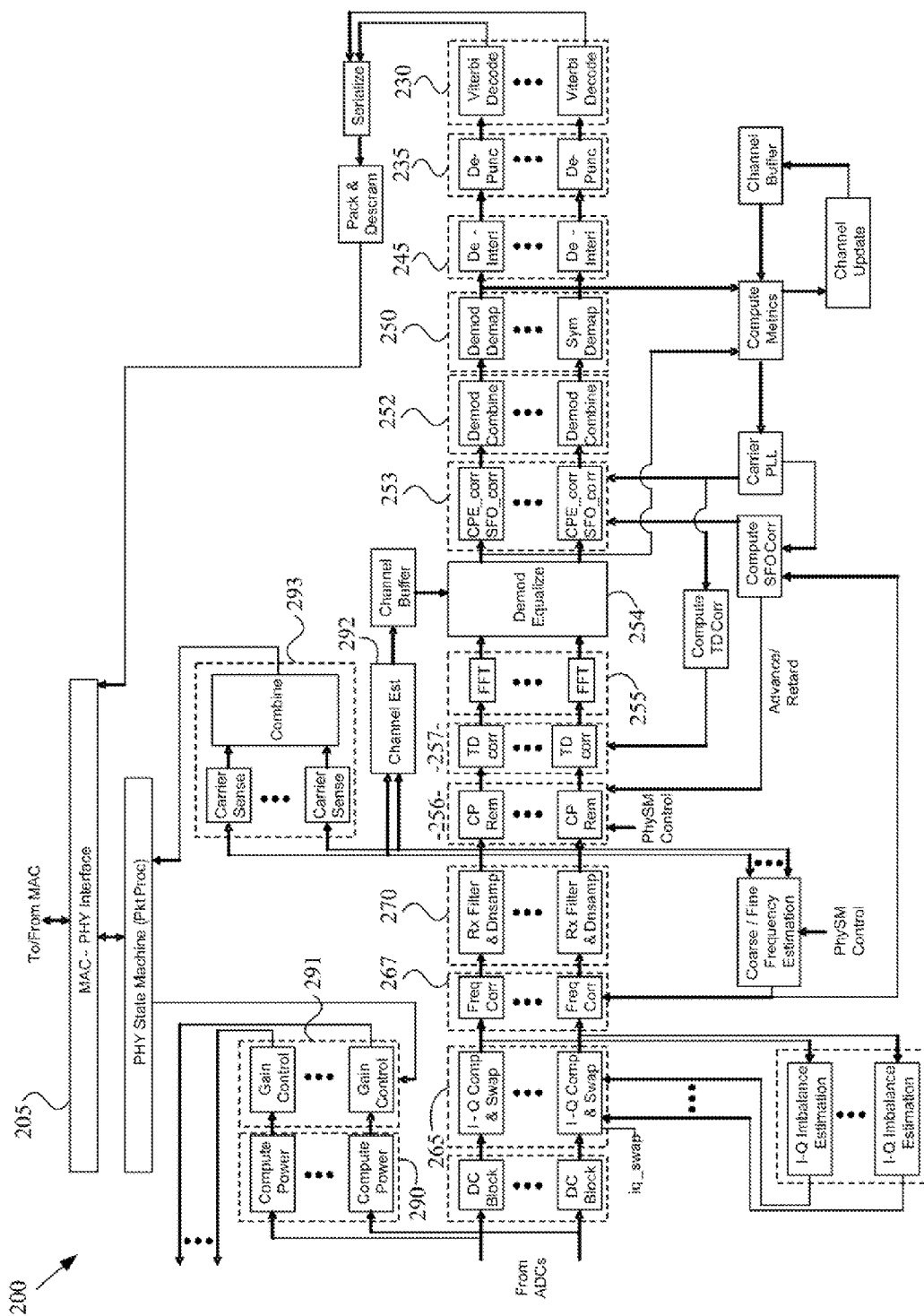
FIG. 2 is a diagram illustrating an exemplary block diagram of a portion of a MIMO receiver circuit.

Turning next to FIG. 2, such figure includes a diagram illustrating an exemplary block diagram of a portion of a receiver circuit 200. Such a receiver circuit 200 may, for example and without limitation, be utilized in a MIMO communication system. As with the transmitter circuit 100 illustrated in FIG. 1 and introduced above, various aspects of the present invention may, for example, be readily incorporated into the exemplary receiver circuit 200.

For illustrative purposes, the following discussion will refer to various portions of the exemplary receiver circuit 200. It should be noted that unless explicitly claimed, the configuration of the exemplary receiver circuit 200 should not limit the scope of various aspects of the present invention. As a non-limiting example, though the exemplary receiver circuit 200 may be utilized in a MIMO communication system, the scope of various aspects of the present invention should not be limited by particular characteristics associated with MIMO communication circuits.

The exemplary receiver circuit 200 receives input signals input to the primary processing blocks and to Automatic Gain Control circuitry, including a power computing module 290 and a gain control module 291. The exemplary receiver circuit 200 processes the received input signals through various signal processing modules, each of which primarily perform a particular signal processing operation, most of which act to effectively back out corresponding signal processing operations performed by signal processing modules of the transmitter (e.g., the exemplary transmitter circuit 100 illustrated in FIG. 1).

For example, the exemplary receiver circuit 200 comprises an I-Q demodulator module 265 that receives parallel signals from an analog-to-digital converter module and performs an I-Q demodulation signal processing operation on the received signals. The receiver circuit 200 may also comprise a frequency correction module 267 that performs a coarse and/or fine frequency correction signal processing operation on the I-Q demodulated signals. The exemplary receiver circuit 200 also comprises a filtering and downsampling module 270 that operates to perform filtering and downsampling signal processing operations on the frequency-corrected signals.

Received signals may then be processed by a cyclic prefix removal module 256 and time domain correction module 257, each of which primarily performs respective signal processing operations on the received signals. Received signals are passed from the time domain correction module 257 to an FFT module 255, which operates to perform a signal processing operation converting the received signals to the frequency domain.

A demodulation/equalization module 254 may then, for example perform a signal processing operation that includes processing the frequency domain signals to counteract various channel conditions. A CPE_correction and SPO_corr module 253 may, for example, perform respective signal processing operations that include performing common phase error offset correction and sampling frequency offset correction, respectively. The received signals may then be provided to a demodulation/combining module 252 and to a symbol demapping module 250 that performs a signal processing operation of demapping symbols (e.g., from a particular constellation). The received signals may then, for example, be passed to a deinterleaving module 245 and a depuncturing module 235 that perform deinterleaving and depuncturing signal processing operations, respectively. The received signals may then be processed by a Viterbi decoder module 230 that operates to perform a decoding signal processing operation on the received data. The decoded data may then, for example, be serialized and otherwise prepared for presentation to the MAC-PHY Interface 205.

As illustrated, the receiver circuit 200 also comprises a channel estimation module 292 that operates to perform a channel estimation signal processing operation and a carrier/timing recover module 293 that operates to perform a carrier/timing recovery signal processing operation on received signals.

Figure 3:
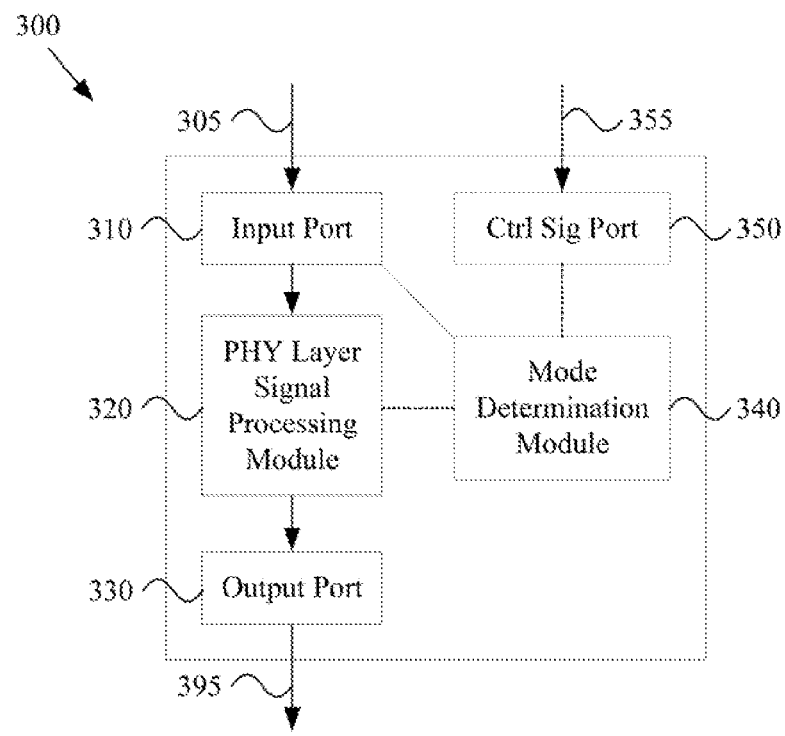
FIG. 3 is a diagram illustrating a non-limiting exemplary signal processing module of a PHY communication layer of a communication system, in accordance with various aspects of the present invention.

Turning next to FIG. 3, such figure includes a diagram illustrating a non-limiting exemplary signal processing module 300 of a PHY communication layer of a communication system, in accordance with various aspects of the present invention. The exemplary signal processing module 300 may, for example and without limitation, share characteristics with any or all of the signal processing modules discussed previously with regard to the exemplary transmitter circuit 100 and exemplary receiver circuit 200 illustrated in FIGS. 1-2 and discussed previously. In an exemplary PHY layer implementation, a baseband processor circuit (e.g., an integrated circuit) may comprise one or more of the exemplary signal processing modules 300.

The exemplary signal processing module 300 may, for example, comprise an input port 310 that operates to receive one or more input PHY layer signals 305 for processing. The input port 310 may, for example, be relatively simple or relatively complex, depending on the nature of the input signal(s) and previous processing circuitry.

The exemplary signal processing module 300 may also, for example, comprise an output port 330 that operates to output one or more output PHY layer signals 395 for subsequent processing (e.g., PHY layer processing). The output port 330 may, for example, be relatively simple or relatively complex, depending on the nature of the output signal(s) and subsequent processing circuitry.

The exemplary signal processing module 300 may further, for example, comprise a PHY layer signal processing module 320. The PHY layer signal processing module 320 may, for example, primarily operate to perform a particular signal processing operation. The following discussion will mostly refer to the PHY layer signal processing module 320 operating to primarily perform a particular signal processing operation, but such singularity is for illustrative purposes and, unless explicitly claimed, should not limit the scope of various aspects of the present invention.

The exemplary PHY layer signal processing module 320 may operate to perform a particular signal processing operation in a plurality of manners (e.g., by operating in any of a plurality of signal processing modes). For example, each of a plurality of signal processing modes may correspond to a particular communication protocol, or a portion thereof. As a non-limiting example, when processing a first PHY layer signal 305 that is associated with (e.g., corresponds to) a first communication protocol, the PHY layer signal processing module 320 may perform its primary signal processing operation on the first PHY layer signal 305 in a first manner by, at least in part, operating in a first signal processing mode. Further for example, when processing a second PHY layer signal 305 that is associated with a second communication protocol, different from the first communication protocol, the PHY layer signal processing module 320 may perform its primary signal processing operation on the second PHY layer signal 305 in a second manner by, at least in part, operating in a second signal processing mode. Such example may then, for example, be extended to any number of different signal processing modes corresponding to any number of respective communication protocols. The following discussion will include numerous non-limiting examples of such operating modes presented to illustrate various aspects of the present invention.

The exemplary signal processing module 300 may also comprise a control signal port 350 that operates to receive a control signal 355 indicative of a particular operating mode in which the signal processing module 300 is to process a received PHY layer signal 305 (e.g., a first operating mode corresponding to a first communication protocol, a second operating mode corresponding to a second communication protocol, etc.). For example and without limitation, such a control signal 355 may comprise a signal characteristic (e.g., a signal feature and/or particular data) that is indicative of a particular communication protocol to which the received PHY layer signal 305 corresponds.

The exemplary signal processing module 300 may also comprise a mode determination module 340 that operates to process a received control signal 355 to determine the particular operating mode of the PHY layer signal processing module 320. The mode determination module 340 may then for example, communicate control information with the PHY layer signal processing module 320 directing the PHY layer signal processing module 320 to process the input PHY layer signal 305 by operating in a particular operating mode.

The mode determination module 340 may also operate to analyze an input PHY layer signal 305 to determine the operating mode of the PHY layer signal processing module 320. For example and without limitation, an input PHY layer signal 305 may comprise particular signal characteristics (e.g., analog or digital, time domain or frequency domain, data, modulation type, coding type, etc.) that correspond to a particular communication protocol. In such a scenario, the mode determination module 340 may operate to determine one or more of such signal characteristics, and from such characteristics, determine an operating mode in which the PHY layer signal processing module 320 is to process such input PHY layer signal 305, and communicate information of such determination to the PHY layer signal processing module 320.

After performing a particular signal processing operation on an input PHY layer signal 305, the PHY layer signal processing module 320 may output one or more signals resulting from such processing to the output port 330 for communication to subsequent PHY layer signal processing circuitry.

Figure 4:
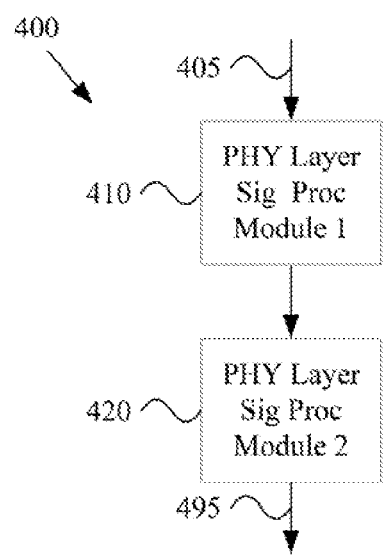
FIG. 4 is a diagram illustrating a non-limiting exemplary portion of a PHY communication layer of a communication system, in accordance with various aspects of the present invention.
Figure 5:
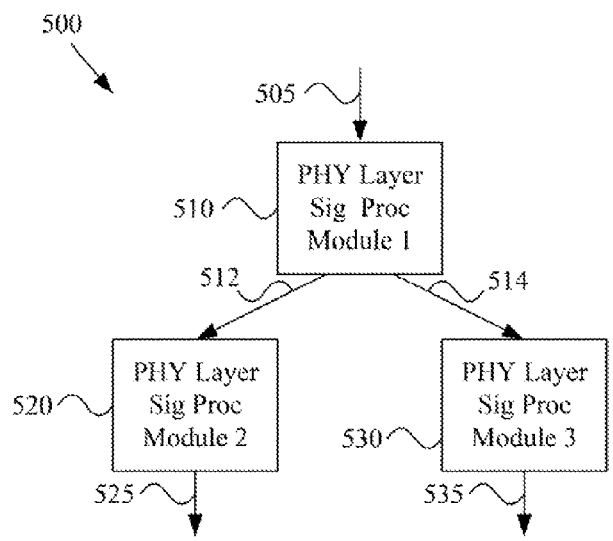
FIG. 5 is a diagram illustrating a non-limiting exemplary portion of a PHY communication layer of a communication system, in accordance with various aspects of the present invention.
Figure 6:
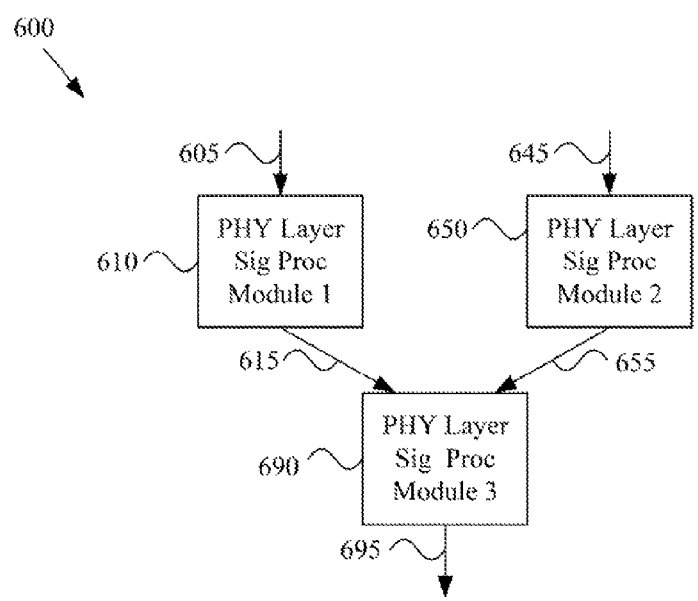
FIG. 6 is a diagram illustrating a non-limiting exemplary portion of a PHY communication layer of a communication system, in accordance with various aspects of the present invention.

The exemplary signal processing module 300 may be coupled to other signal processing modules (e.g., on the input and/or output sides). FIGS. 4-6 provide non-limiting examples of the exemplary signal processing module 300 interfacing with other signal processing modules.

FIG. 4 is a diagram illustrating a non-limiting exemplary portion (or circuit) 400 of a PHY communication layer of a communication system, in accordance with various aspects of the present invention. For example, the exemplary PHY layer circuit 400 may comprise a first PHY layer signal processing module 410 and a second PHY layer signal processing module 420. The first 410 and second 420 PHY layer signal processing modules may, for example and without limitation, share any or all characteristics with the signal processing module 300 illustrated in FIG. 3. The first PHY layer signal processing module 410 may receive an input PHY layer signal 405, perform a first signal processing operation on such signal, and output a first-processed signal to the second PHY layer signal processing module 420. The second PHY layer signal processing module 420 may receive the first-processed signal, perform a second signal processing operation on such signal, and output a second-processed signal 495.

In the exemplary circuit 400, both the first PHY layer signal processing module 410 and second PHY layer signal processing module 420 may operate to perform respective signal processing operations on input PHY layer signals. The exemplary transmitter circuit 100 and receiver circuit 200 illustrated in FIGS. 1-2 provide various examples of such respective signal processing operations. For example, each of the first PHY layer signal processing module 410 and second PHY layer signal processing module 420 may operate to perform a particular respective signal processing operation in a plurality of manners, depending on the nature of the input PHY layer signal 405. For example, the PHY layer signal processing modules 410, 420 may each be operable in a plurality of signal processing modes, depending on the communication protocol to which the input PHY layer signal 405 corresponds.

FIG. 5 is a diagram illustrating a non-limiting exemplary portion (or circuit) 500 of a PHY communication layer of a communication system, in accordance with various aspects of the present invention. For example, the exemplary PHY layer circuit 500 may comprise a first PHY layer signal processing module 510. The first PHY layer signal processing module 510 may, for example and without limitation, share any or all characteristics with the signal processing module 300 illustrated in FIG. 3. The first PHY layer signal processing module 510 may, for example, receive an input PHY layer signal 505, perform a first signal processing operation on such signal, and output a first-processed signal to the second PHY layer signal processing module 520 and/or third PHY layer signal processing module 530.

The exemplary PHY layer circuit 500 may also comprise a second PHY layer module 520 that operates primarily to perform a second PHY layer signal processing operation on a PHY layer signal 512 received from the first PHY layer signal processing module 510. The second PHY layer signal processing operation may, for example, sequentially follow the first PHY layer signal processing operation performed by the first PHY layer module 510. The second PHY layer signal processing module 520 may, for example, operate to perform the second PHY layer signal processing operation in only one operating mode (e.g., a mode that is associated with performing the second PHY layer signal processing operation on an input PHY layer signal 512 associated with the first communication protocol). The second PHY layer signal processing module 520 may then output the second-processed PHY layer signal 525 to a subsequent PHY layer signal processing module for further processing in accordance with the first communication protocol.

The exemplary PHY layer circuit 500 may also comprise a third PHY layer signal processing module 530 that operates primarily to perform the second PHY layer signal processing operation (i.e., the same PHY layer signal processing operation performed by the second PHY layer module 520) on a PHY layer signal 514 received from the first PHY layer signal processing module 510. The third PHY layer signal processing module 530 may, for example, operate to perform the second PHY layer signal processing operation in only one operating mode (e.g., a mode that is associated with performing the second PHY layer signal processing operation on an input PHY layer signal 514 associated with the second communication protocol). The third PHY layer signal processing module 530 may then output the second-processed PHY layer signal 535 to a subsequent PHY layer signal processing module for further processing in accordance with the second communication protocol.

In a non-limiting exemplary scenario, the first PHY layer signal processing module 510 may receive an input PHY layer signal 505 that is associated with a second communication protocol. The first PHY layer signal processing module 510 may then, for example, operate to perform the first PHY layer signal processing operation on the input PHY layer signal 505 by, at least in part, operating in a second operating mode that is associated with performing the first PHY layer signal processing operation on an input PHY layer signal 505 associated with the second communication protocol. The first PHY layer signal processing module 510 may then output the first-processed PHY layer signal 514 to the third PHY layer signal processing module 530, which operates to perform the second PHY layer signal processing operation on input PHY layer signals associated with the second communication protocol. In such an exemplary scenario, the second PHY layer signal processing module 520 might not be utilized until an input PHY layer signal associated with the first communication protocol is received for processing, whereas the first PHY layer signal processing module 510 might be utilized to perform its respective PHY layer signal processing operation(s) on input PHY layer signals associated with the first and second communication protocols.

FIG. 6 is a diagram illustrating a non-limiting exemplary portion (or circuit) 600 of a PHY communication layer of a communication system, in accordance with various aspects of the present invention. For example, the exemplary PHY layer circuit 600 may comprise a first PHY layer signal processing module 610 that operates primarily to perform a first PHY signal processing operation on a PHY layer signal 605 received from a previous PHY layer signal processing module. The first PHY layer signal processing module 610 may, for example, operate to perform the first PHY layer signal processing operation in only one operating mode (e.g., a mode that is associated with performing the first PHY layer signal processing operation on an input PHY layer signal 605 associated with the first communication protocol). The first PHY layer signal processing module 610 may then output the first-processed PHY layer signal 615 to a subsequent PHY layer signal processing module (e.g., the third PHY layer signal processing module 690) for further processing in accordance with the first communication protocol.

Also for example, the exemplary PHY layer circuit 600 may comprise a second PHY layer signal processing module 650 that operates primarily to perform the first PHY layer signal processing operation (i.e., the same PHY layer signal processing operation performed by the first PHY layer module 610) on a PHY layer signal 645 received from a previous PHY layer signal processing module. The second PHY layer signal processing module 650 may, for example, operate to perform the first PHY layer signal processing operation in only one operating mode (e.g., a mode that is associated with performing the first PHY layer signal processing operation on an input PHY layer signal 645 associated with the second communication protocol). The second PHY layer signal processing module 650 may then output the first-processed PHY layer signal 655 to a subsequent PHY layer signal processing module (e.g., the third PHY layer signal processing module 690) for further processing in accordance with the second communication protocol.

Further for example, the exemplary PHY layer circuit 600 may comprise a third PHY layer signal processing module 690. The third PHY layer signal processing module 690 may, for example and without limitation, share any or all characteristics with the signal processing module 300 illustrated in FIG. 3. The third PHY layer signal processing module 690 may, for example, receive an input PHY layer signal (615 and/or 655), perform a second signal processing operation on such signal, and output a second-processed signal 695 to a subsequent PHY layer signal processing module for continued processing.

In a non-limiting exemplary scenario, the first PHY layer signal processing module 610 may receive an input PHY layer signal 605 that is associated with the first communication protocol. The first PHY layer signal processing module 610 may then, for example, operate to perform the first PHY layer signal processing operation on the input PHY layer signal 605 (e.g., in the operating mode associated with the first communication protocol, which might be the only mode in which the first PHY layer signal processing module 610 operates). The first PHY layer signal processing module 610 may then, for example, output the first-processed input PHY layer signal 615 to the third PHY layer signal processing module 690.

The third PHY layer signal processing module 690 may then receive the input PHY layer signal 615, determine that the received PHY layer signal 615 is associated with the first communication protocol, and perform the second PHY layer signal processing operation on the received PHY layer signal 615 by, at least in part, operating in the first operating mode, which corresponds to the first communication protocol. The third PHY layer signal processing module 690 may then output the second-processed PHY layer signal 695 to subsequent circuitry for continued processing in accordance with the first communication protocol.

The previous discussion refers generally to various signal processing operations performed by various respective signal processing modules. The following discussion presents non-limiting examples of such signal processing modules and/or operations.

Figure 7:
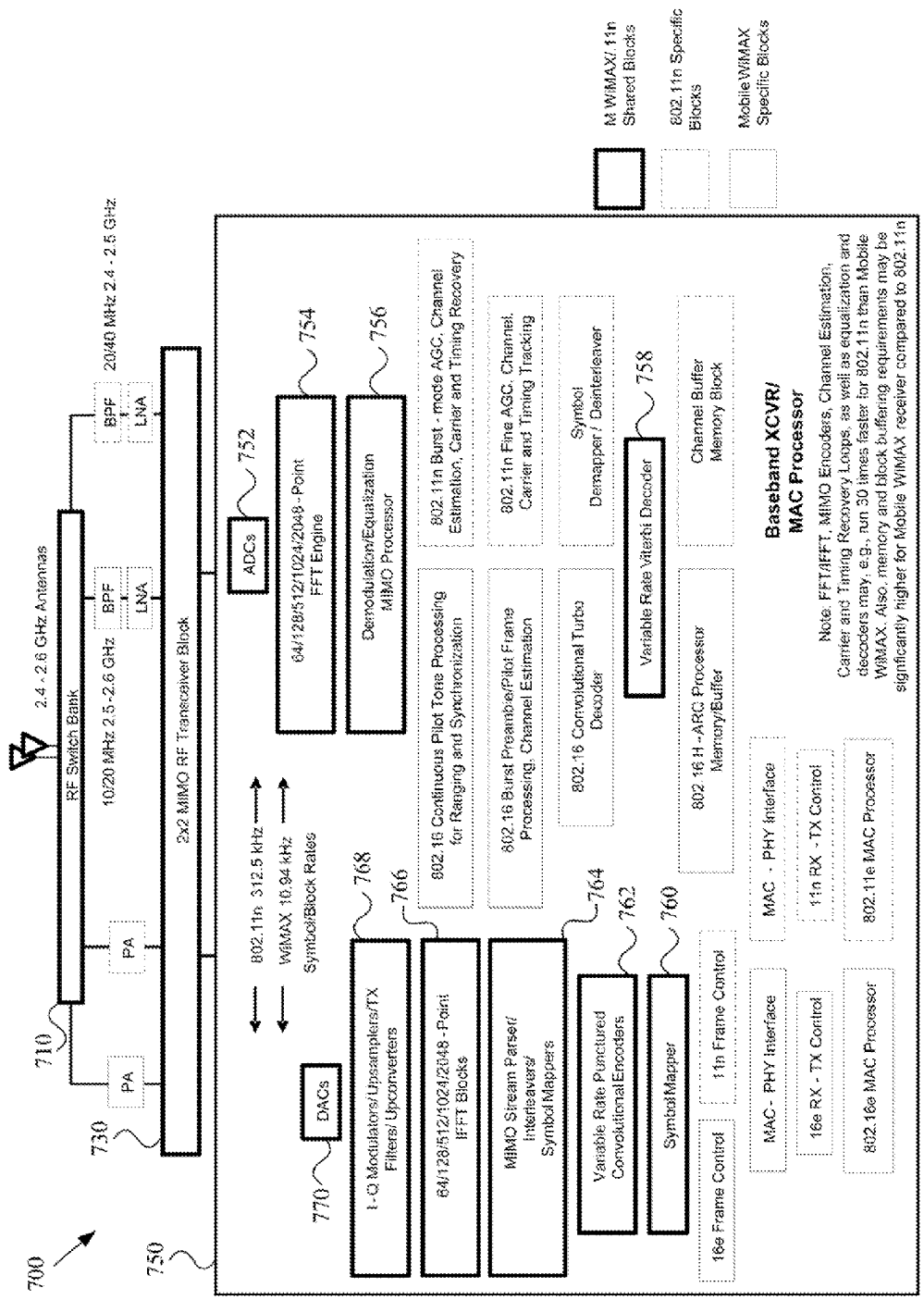
FIG. 7 is a diagram illustrating a non-limiting exemplary multiple-mode shared PHY layer in accordance with various aspects of the present invention.

Turning to FIG. 7, such figure shows a diagram illustrating a non-limiting exemplary multiple-mode shared PHY layer 700 in accordance with various aspects of the present invention. The illustration of FIG. 7 illustrates various shared PHY layer signal processing modules in the context of a dual-mode IEEE 802.11/IEEE 802.16 transceiver (e.g., 802.11n and WiMAX). The exemplary PHY layer 700 may, for example and without limitation, share any or all characteristics with the exemplary circuit and/or modules illustrated in FIGS. 1-6 and discussed previously.

The following discussion will occasionally refer to communicating in accordance with a particular PHY layer specification (or with a particular type of communication network) as communicating in a particular communication mode. For example and without limitation, communicating in a first communication mode may comprise communicating with a first communication network in accordance with the IEEE 802.11n PHY layer specification, and communicating in a second communication mode may comprise communicating with a second communication network in accordance with the IEEE 802.16 (or WiMAX) PHY layer specification.

The communication modes may generally, for example, be implemented one at a time (e.g., operating in a first communication mode at a different time than a second communication mode), but may also be implemented concurrently. In such a concurrent implementation, various components may comprise pure parallel-processing paths. Alternatively, various components may be operable on a time-shared basis, where such time-sharing is efficient enough to meet communication requirements (e.g., data processing rate) associated with multiple communication modes simultaneously.

It should be noted that such particular communication protocols, and associated circuitry, are presented for illustrative clarity and should not limit the scope of various aspects of the present invention, unless specific features thereof are explicitly claimed. Also for example, the illustration in FIG. 7 presents only two communication protocols (e.g., a dual-mode architecture), while the scope of various aspects of the present invention is readily extensible to PHY layers providing more than two communication protocol modes.

In general, the illustration in FIG. 7 presents various signal processing modules in a block diagram form. Signal processing modules outlined by a dashed line represent PHY layer signal processing modules that are generally dedicated to performing a signal processing operation in a single mode associated with a first communication protocol (e.g., 802.11n). Signal processing modules outlined by a relatively thin solid line represent PHY layer signal processing modules that are generally dedicated to performing a signal processing operation in a single mode associated with a second communication protocol (e.g., 802.16 and/or 802.16e). Such single-mode signal processing modules may, for example and without limitation, share any or all characteristics with various PHY layer signal processing modules discussed previously (e.g., PHY layer signal processing modules 520, 530, 610 and 650).

Signal processing modules outlined by a relatively thick solid line represent PHY layer signal processing modules that are generally dedicated to performing a signal processing operation in a plurality of different modes depending on the type of PHY layer signal being processed (e.g., depending on the communication protocol with which an input PHY layer signal is associated). Such signal processing modules may, for example and without limitation, share any or all characteristics with various PHY layer signal processing modules discussed previously (e.g., PHY layer signal processing modules 300, 410, 420, 510 and 690).

Note that various PHY layer signal processing modules to be discussed below may be implemented in any of a variety of signal processing arrangements. Thus, the particular illustrated order and/or discussion order should not be construed as limiting unless such an order is explicitly claimed.

The exemplary PHY layer 700 comprises various RF circuitry and/or antennas that may be shared between a plurality of communication modes (e.g., where various communication modes share portions of frequency bands or utilize relatively proximate frequency bands). As a non-limiting example, WiFi may utilize the 2.4 to 2.48 GHz band, while WiMAX utilizes the 2.5 to 2.6 GHz band. In such an example, antennas with characteristics commensurate with communicating in the frequency range of 2.4 to 2.6 GHz may be shared between WiFi and WiMAX (and other communication modes). Other RF components, for example RF switch bank components 710 may be similarly shared between communication modes.

The exemplary PHY layer 700 also comprises various RF band-pass filters ("BPF"), low-noise amplifiers ("LNA") and power amplifiers ("PA"), which may, for example, be different enough between different communication modes to warrant separate optimized designs. For example, a plurality of such separate BPFs might be incorporated into an array of selectable BPFs. However, if practical from a performance, manufacturing and/or cost perspective, such BPFs might alternatively be adaptable (e.g., comprising programmable filtered frequency ranges and/or roll-off characteristics) to operate with a plurality of different communication modes. Also for example, in the example illustrated, the LNAs are different for each communication mode. For example, respective sensitivity requirements for the LNAs may be different enough to warrant separate optimized designs for the LNAs. For example, the architecture might include an array of selectable optimized LNAs. However, if practical from a performance, manufacturing and/or cost perspective, such LNAs might alternatively be adaptable (e.g., comprising programmable amplification and/or sensitivity) to operate with different communication modes.

The exemplary PHY layer 700 may, for example, comprise a MIMO RF transceiver block 730. For example and without limitation, 2×2 MIMO processing may be utilized in communicating in accordance with both 802.11n and WiMAX and may be shared between the different communication modes.

In a receiver example, the MIMO RF transceiver block 730 (or receiver portions thereof) may, for example, comprise a pair of receivers. Although at least portions of communication frequency bands might not be shared between various communication modes, the MIMO RF transceiver block (or module) 730 may be shared (e.g., between WiFi and WiMAX communication modes).

The MIMO RF transceiver block 730 may also, for example, comprise various circuits or modules adapted to perform down conversion. The output of such a block 730 may, for example, be an I/F or baseband signal.

The exemplary PHY layer 700 may also comprise a baseband processor 750. The baseband processor 750 may, for example and without limitation, share any or all characteristics with the exemplary circuits and/or modules illustrated in FIGS. 1-6 and discussed previously. For example and without limitation, the baseband processor 750 may comprise any or all of the various signal processing module configurations illustrated in FIGS. 1-6.

The baseband processor 750 may, for example, comprise an ADC signal processing module 752 that operates to perform ADC processing on a received PHY layer signal in a first manner by operating in a first operating mode, when such received PHY layer signal is associated with a first communication protocol. The ADC signal processing module 752 may also, for example, operate to perform ADC processing on a received PHY layer signal in a second manner, different from the first manner, by operating in a second operating mode, when such received PHY layer signal is associated with a second communication protocol.

Such a shared ADC signal processing module 752 may be implemented in a variety of manners. For example and without limitation, the ADC signal processing module 752 may be fixed or may be programmable to different resolutions and/or accuracies and/or convergence characteristics, depending on signal processing needs associated with a particular communication protocol. The ADC signal processing module 752 may also, for example, operate to perform frequency conversion (e.g., I/F to baseband) if necessary.

The baseband processor 750 may, for example, comprise an FFT signal processing module (or engine) 754 that operates to perform FFT processing on a received PHY layer signal in a first manner by operating in a first operating mode, when such received PHY layer signal is associated with a first communication protocol. The FFT signal processing module 754 may also, for example, operate to perform FFT processing on a received PHY layer signal in a second manner, different from the first manner, by operating in a second operating mode, when such received PHY layer signal is associated with a second communication protocol.

For example and without limitation, the FFT signal processing module 754 may operate to perform FFT signal processing operations of varying numbers of points (e.g., N-point FFTs). The exemplary FFT signal processing module 754 is illustrating as being operable to perform 64, 128, 512, 1024 and 2048-point FFTs, depending on signal processing needs associated with a particular communication protocol being utilized. As a non-limiting example, the 64-point and 128-point FFTs may be utilized for WiFi communication, and the 128-point and 128+-point FFTs may be utilized for WiMAX communication.

In various exemplary scenarios, different communication modes (or protocols) may also have different respective bandwidths. In one case, for example 802.11n, there might be a 64-point FFT and a 128-point FFT that are performed at 312 KHz. Thus, there might be a bandwidth of 20 MHz or 40 MHz. In other case, for example mobile WiMAX, there may be a 128-point (or 512 or 1024 or 2048-point) FFT, which when run at 10.94 KHz, results in frequency ranges from about 1.4 MHz to about 22 MHz. Thus, the FFT engine 754 might, for example, be operated in various operating modes such that the FFT engine 754 operates relatively fast with relatively less samples or runs relatively slow with relatively more samples, depending on signal processing needs associated with particular communication protocols.

Such FFT engine 754 flexibility may be architected in a manner of ways, including for example and without limitation, pipelining Such pipelining may, for example, comprise operating 64 elements at a high rate, replicated enough to mimic a 2048 element FFT at a slower rate. Such FFT engine flexibility might be optimized for particular samples and rates associated with selected communication protocols, or may be programmably flexible, such that the flexible FFT engine might be operable to perform in accordance with any of a large variety of communication modes (or protocols). Such enhanced flexibility might, for example, result in the same flexible FFT engine 754 being utilized in a variety of different communication devices (e.g., baseband processors) utilizing a variety of respective communication mode combinations.

Alternatively, for example, rather than pipelining, a 64-point FFT engine might be replicated in parallel as necessary, and corresponding clock speeds reduced as necessary to meet the bandwidth requirements. Alternatively, for example, a 2048-point FFT might be sub-sampled to derive a 64-point FFT.

The baseband processor 750 may, for example, comprise a MIMO processor module 756 that operates to perform MIMO demodulation and/or equalization signal processing on a received PHY layer signal in a first manner by operating in a first operating mode, when such received PHY layer signal is associated with a first communication protocol. The MIMO processor module 756 may also, for example, operate to perform MIMO demodulation and/or equalization signal processing on a received PHY layer signal in a second manner, different from the first manner, by operating in a second operating mode, when such received PHY layer signal is associated with a second communication protocol.

The MIMO processor module 756 may be implemented in a variety of manners. For example, the MIMO processor module 756 may comprise a massively parallel block processor that processes matrices of data arriving from multiple antennas (2 antennas in the exemplary illustration). The MIMO processor module 756 may then perform various MIMO operations such as, for example, equalization operations, correlation operations, etc. To provide for sharing between a plurality of communication modes, the MIMO processor module 756 may comprise a variety of characteristics.

For example and without limitation, the MIMO processor module 756 may be architected to operate at different rates and/or to utilize respective matrices of different sizes. The MIMO processor module 756 may, for example, operate to perform smaller matrix operations at a relatively high speed or to perform smaller matrix operations at a relatively high speed in a pipelined fashion to mimic the performance of a relatively large matrix operation at a relatively low speed. Alternatively, for example, the MIMO processor module 756 may operate to process only a portion of a large matrix operation at a relatively high speed to provide smaller matrix operations (e.g., in a sparse matrix implementation). For example, only particular cells, rows or columns of a larger matrix might be processed (e.g., sparse matrix processing), only particular cells, rows or columns of a larger matrix might be loaded with relevant information (e.g., sparse matrix loading), or only particular cells of a matrix might be utilized after processing (e.g., sparse matrix unloading). Note that the sparse matrix processing approach may also be utilized to accomplish an energy-savings.

As a non-limiting example, a 2048×2048 matrix might comprise 32 64K (256×256) blocks or 8 256K (512×512) blocks, and particular points may be selected from each of the sub-matrices to obtain the desired point(s). Such selected points may be utilized independently or aggregated with other points. For example, all points in a particular sub-matrix may be added, averaged or otherwise filtered. The pipelined or sparse implementation may, for example, utilize smart data demultiplexing and multiplexing to implement the pipelining of relatively small matrix operations or the sub-sampling (or sparsing) of larger matrix operations.

The exemplary baseband processor 750 comprises a variety of signal processing modules that might not be shared for signal processing corresponding to a plurality of communication protocols. Note that illustrating such signal processing modules as independent is merely illustrative and is not meant to exclude such signal processing modules from being utilized in a shared manner should such signal processing modules be architected to operate in a shared manner.

Such independent modules may, for example, share any or all characteristics with exemplary modules 520, 530, 610 and 650 illustrated in FIGS. 5-6 and discussed previously. Such independent modules may, for example, comprise signal processing modules that operate to perform synchronization, timing recovery, channel estimation, mapping, ranging, burst or continuous signal processing operations, etc. The illustration shows that, depending on the particular communication modes of the multiple communication modes, particular aspects of such functionality might be processed in independent hardware and/or software modules. As discussed previously with regard to the BPFs and LNAs, depending on the details of the particular communication modes, such modules may be shared between communication modes or may be separate.

For example and without limitation, the illustrated system in FIG. 7 utilizes a convolutional decoder signal processing module for 802.16, but not for 802.11. Such a decoder may generally, for example, operate to process an extra layer of decoding for a particular communication mode (e.g., 802.16), where such extra layer of decoding might be skipped for a communication mode that does not utilize such an extra layer of decoding (e.g., 802.11n)

Also for example, the exemplary 802.16 signal processing path might flow through a module that performs continuous synchronization and ranging, while the 802.11 signal processing path might flow through a completely separate module for synchronization. Further for example, in the particular 802.16/802.11 multimode system illustrated, WiMAX may utilize hybrid-ARQ (e.g., ARQ based on multiple instances of a received packet) while WiFi might not. In such a scenario, the respective signal processing pathways through the PHY layer (e.g., baseband processor 750) may differ with regard to ARQ processing for WiMAX and WiFi. Note that in an alternative scenario, hybrid-ARQ and ARQ processing modules (e.g., hardware and/or software) may share various components or sub-modules rather than being completely independent. For example, a signal processing module adapted to perform hybrid-ARQ might also be adapted to perform standard ARQ (e.g., without utilizing additional memory associated with hybrid-ARQ processing).

The baseband processor 750 may, for example, comprise a Viterbi decoder signal processing module 758 that operates to perform Viterbi decoding on a received PHY layer signal in a first manner by operating in a first operating mode, when such received PHY layer signal is associated with a first communication protocol. The Viterbi decoder signal processing module 758 may also, for example, operate to perform Viterbi decoding on a received PHY layer signal in a second manner, different from the first manner, by operating in a second operating mode, when such received PHY layer signal is associated with a second communication protocol.

For example and without limitation, the Viterbi decoder signal processing module 758 may be implemented in a variety of manners. For example, such a shared Viterbi decoder 758 may, for example, be a variable-rate decoder. Such a shared Viterbi decoder 758 may also, for example, be configurable to utilize different respective metrics (e.g., error metrics) in performing decoding operations associated with different respective communication modes. Such a shared Viterbi decoder 758 might, for example, be configurable to utilize different path (or time) lengths when considering history to determine the error metric. Alternatively, for example, such a shared Viterbi decoder 758 might be adapted to always perform its processing utilizing the longest path length of the various communication modes. Thus, in some instances, an unnecessarily long path may be utilized for a communication mode corresponding to a smaller path length, but without adversely affecting operation.

For example and without limitation, Mobile WiMAX and WiFi might both utilize the same general type of convolutional code, but with different specific parameters. A shared Viterbi decoder might be adapted to perform Viterbi decoding in different respective operating modes associated with either Mobile WiMAX or WiFi.

The previous examples focused on the receiver side (e.g., the right side) of the exemplary baseband processor 750 illustrated in FIG. 7. Generally analogous counterpart components may be shared in transmitting circuitry, non-limiting examples of which will now be provided.

As discussed previously with regard to various receiver-side signal processing modules, the transmitting side of the exemplary baseband processor 750 may also comprise a variety of signal processing modules that might not be shared for signal processing corresponding to a plurality of communication protocols. Note that illustrating such signal processing modules as independent is merely illustrative and is not meant to exclude such signal processing modules from being utilized in a shared manner should such signal processing modules be architected to operate in a shared manner.

For example, the exemplary system 700 (e.g., the baseband processor 750) may comprise independent MAC processors, independent RX-TX control modules, independent MAC-PHY interface modules, independent frame control modules, etc.

The baseband processor 750 may, for example, comprise a shared symbol mapper signal processing module 760 that operates to perform symbol mapping on a received PHY layer signal (e.g., received by the symbol mapper 760) in a first manner by operating in a first operating mode, when such received PHY layer signal is associated with a first communication protocol. The symbol mapper 760 may also, for example, operate to perform symbol mapping on a received PHY layer signal in a second manner, different from the first manner, by operating in a second operating mode, when such received PHY layer signal is associated with a second communication protocol. As a non-limiting example, the shared symbol mapper 760 may be adapted to utilize QAM and OFDM symbols. The symbol mapper may, for example, operate to map QAM symbols to an FFT in a similar manner for multiple communication modes.

The baseband processor 750 may, for example, comprise a shared variable-rate punctured convolution encoder signal processing module 762 that operates to perform puncturing on a received PHY layer signal (e.g., received by the encoder 762) in a first manner (e.g., at a first level of puncturing) by operating in a first operating mode, when such received PHY layer signal is associated with a first communication protocol. The punctured convolutional encoder 762 may also, for example, operate to perform puncturing on a received PHY layer signal in a second manner (e.g., at a second level of puncturing), different from the first manner, by operating in a second operating mode, when such received PHY layer signal is associated with a second communication protocol. As a non-limiting example, different taps may be utilized for performing signal processing in accordance with different respective communication modes.

The baseband processor 750 may, for example, comprise a shared MIMO stream processing module 764 that operates to perform MIMO stream parsing, interleaving, symbol mapping, etc. in a first manner by operating in a first operating mode, when a received PHY layer signal (e.g., received at the MIMO stream processing module 764) is associated with a first communication protocol. The MIMO stream processor module 764 may also, for example, operate to perform puncturing on a received PHY layer signal in a second manner, different from the first manner, by operating in a second operating mode, when such received PHY layer signal is associated with a second communication protocol. For example and without limitation, such a shared MIMO stream processing module 764 may utilize any of the matrix processing innovations discussed previously (e.g., rate adjustment, pipelining architecture, sparse matrix loading/processing/unloading, etc.) with regard to the MIMO processor module 756.

The baseband processor 750 may, for example, comprise an IFFT signal processing module (or engine) 766 that operates to perform IFFT processing on a received PHY layer signal (e.g., received by the IFFT signal processing module 766) in a first manner by operating in a first operating mode, when such received PHY layer signal is associated with a first communication protocol. The IFFT signal processing module 766 may also, for example, operate to perform IFFT processing on a received PHY layer signal in a second manner, different from the first manner, by operating in a second operating mode, when such received PHY layer signal is associated with a second communication protocol. For example and without limitation, the IFFT engine 766 may operate to perform in a plurality of operating modes generally related to (e.g., inversely related to) the operating modes discussed previously related to the FFT engine 754.

The baseband processor 750 may, for example, comprise various signal processing modules 768 that operate to perform I-Q modulation, upsampling, transmit filtering, upconverting, etc. in a first manner by operating in a first operating mode, when such received PHY layer signal is associated with a first communication protocol. The various signal processing modules 768 may also, for example, operate to perform such signal processing on a received PHY layer signal in a second manner, different from the first manner, by operating in a second operating mode, when such received PHY layer signal is associated with a second communication protocol. For example and without limitation, such various signal processing modules 768 may be programmable or selectable (e.g., from a toolbox of components) in accordance with the mandates of a particular communication mode or protocol.

The baseband processor 750 may, for example, comprise a digital-to-analog converter ("DAC") signal processing module 770 that operates to perform DAC processing on a received PHY layer signal (e.g., received by the DAC signal processing module 770) in a first manner by operating in a first operating mode, when such received PHY layer signal is associated with a first communication protocol. The DAC signal processing module 770 may also, for example, operate to perform DAC processing on a received PHY layer signal in a second manner, different from the first manner, by operating in a second operating mode, when such received PHY layer signal is associated with a second communication protocol. For example and without limitation, the DAC 770 may operate to perform in a plurality of operating modes generally related to (e.g., inversely related to) the operating modes discussed previously related to the ADC signal processing module 752.

Figure 8:
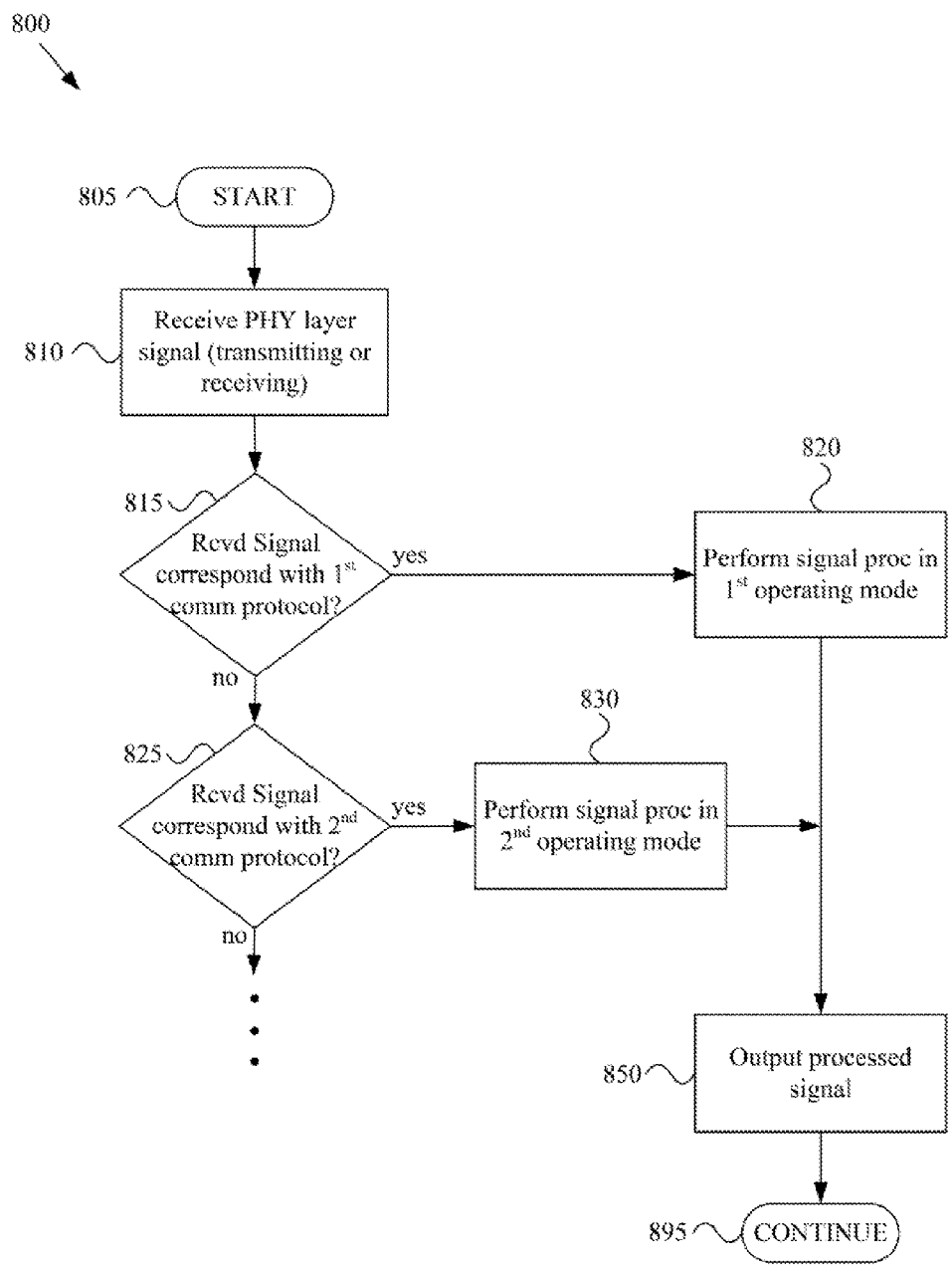
FIG. 8 is a flow diagram illustrating an exemplary method for performing PHY layer processing in a communication system, in accordance with various aspects of the present invention.

Various aspects of the present invention provide a method for performing PHY layer signal processing in a communication system. FIG. 8 provides an illustration of a non-limiting exemplary method. FIG. 8 is a flow diagram illustrating an exemplary method 800 for performing PHY layer processing in a communication system, in accordance with various aspects of the present invention. For example and without limitation, the various steps illustrated in FIG. 8 may share any or all characteristics with the functionality discussed previously with regard to the various signal processing modules illustrated in FIGS. 1-7.

The exemplary method 800 may be performed by any of a variety of PHY layer signal processing modules (e.g., hardware and/or software modules). For example and without limitation, the exemplary method 800 may be performed by an integrated circuit (e.g., a baseband processor chip or a portion thereof).

The exemplary method 800 begins at step 805. The exemplary method 800 may begin executing in response to any of a variety of conditions. For example and without limitation, the exemplary method 800 may begin executing in response to a command to begin, in response to arrival of a signal at an input port, periodically, in response to a timer interrupt, etc.

The exemplary method 800 may, at step 810, comprise receiving an input PHY layer signal at a first PHY layer signal processing module that operates primarily to perform a first PHY layer signal processing operation on an input PHY layer signal. Step 810 may, for example and without limitation, share functional characteristics with the input port 310 of the exemplary signal processing module 300 illustrated in FIG. 3. Step 810 may comprise receiving such an input PHY layer signal in any of a variety of manners. In a non-limiting scenario, step 810 may comprise receiving the input PHY layer signal from another shared PHY layer signal processing module (e.g., in a manner similar to that shown in FIG. 4) or from any of a plurality of independent PHY layer signal processing modules (e.g., in a manner similar to that shown in FIG. 6).

The exemplary method 800 may, at step 815, comprise performing a flow control operation. Step 815 may, for example comprise determining whether the received input PHY layer signal is associated with the first communication protocol. Step 815 may, for example and without limitation, share functional characteristics with the exemplary mode determination module 340 illustrated in FIG. 3 and discussed previously.

Step 815 may comprise making such determination in any of variety of manners. For example and without limitation, step 815 may comprise analyzing characteristics of the received input PHY layer signal to determine whether the received input PHY layer signal is associated with the first communication protocol. Alternatively, for example, step 815 may comprise receiving a control signal and determining whether the received input PHY layer signal is associated with the first communication protocol by, at least in part, analyzing the received control signal.

Step 815 may then, for example, comprise directing execution flow of the exemplary method 800 in accordance with the mode determination. For example, if step 815 comprises determining that the received input PHY layer signal is associated with the first communication protocol, then step 815 may comprise directing execution flow of the exemplary method 800 to step 820 for performing signal processing in accordance with the first operating mode. Alternatively, if step 815 comprises determining that the received input PHY layer signal is not associated with the first communication protocol, then step 815 may comprise directing execution flow of the exemplary method 800 to step 825 for a subsequent protocol determination.

The exemplary method 800 may, at step 820, comprise processing, at the first PHY layer signal processing module, the received input PHY layer signal in a first manner by, at least in part, operating the first PHY layer signal processing module in a first operating mode. Various non-limiting examples of such operating modes for various PHY layer signal processing modules were presented previously. Step 820 may, for example and without limitation, share any or all functional characteristics with any of the PHY layer signal processing modules discussed previously in the discussions of FIGS. 1-7.

The exemplary method 800 may, at step 825, comprise a flow control operation. Step 825 may, for example comprise determining whether the received input PHY layer signal is associated with the second communication protocol. Step 825 may, for example and without limitation, share functional characteristics with the exemplary mode determination module 340 illustrated in FIG. 3 and discussed previously.

Step 825 may comprise making such determination in any of variety of manners. For example and without limitation, step 825 may comprise analyzing characteristics of the received input PHY layer signal to determine whether the received input PHY layer signal is associated with the second communication protocol. Alternatively, for example, step 825 may comprise receiving a control signal and determining whether the received input PHY layer signal is associated with the second communication protocol by, at least in part, analyzing the received control signal.

Step 825 may then, for example, direct execution flow of the exemplary method 800 in accordance with the mode determination. For example, if step 825 comprises determining that the received input PHY layer signal is associated with the second communication protocol, then step 825 may comprise directing execution flow of the exemplary method 800 to step 830 for performing signal processing in accordance with the second operating mode. Alternatively, if step 825 comprises determining that the received input PHY layer signal is not associated with the second communication protocol, then step 825 may comprise directing execution flow of the exemplary method 800 to a subsequent step for a subsequent protocol determination.

The exemplary method 800 may, at step 830, comprise processing, at the first PHY layer signal processing module, the received input PHY layer signal in a second manner different from the first manner by, at least in part, operating the first PHY layer signal processing module in a second operating mode different from the first operating mode. Various non-limiting examples of such operating modes for various PHY layer signal processing modules were presented previously. Step 830 may, for example and without limitation, share any or all functional characteristics with any of the PHY layer signal processing modules discussed previously in the discussions of FIGS. 1-7.

The exemplary method 800 may, at step 850, comprise outputting the processed PHY layer signal from the first PHY layer signal processing module (e.g., to subsequent circuitry for additional PHY layer signal processing). Step 850 may, for example and without limitation share functional characteristics with the output port 330 of the exemplary signal processing module 300 illustrated in FIG. 3. For example and without limitation, step 850 may comprise outputting the processed PHY layer signal to another shared PHY layer signal processing module (e.g., in a manner similar to that shown in FIG. 4) or to any of a plurality of non-shared PHY layer signal processing modules in accordance with the particular communication protocol of the processed PHY layer signal (e.g., in a manner similar to that shown in FIG. 5).

The exemplary method 800 may comprise performing continued processing 895. Such continued processing 895 may, for example, comprise performing additional PHY layer signal processing operations utilizing subsequent PHY layer signal processing modules.

The block diagrams discussed previously included various functional blocks, which were presented in a modular fashion for illustrative clarity. Such functional blocks may be implemented in hardware, software or a combination thereof. Note also that various hardware and/or software components or modules may share various hardware and/or software submodules. For example, various functions in more than one module might be performed by a digital signal processor circuit executing software instructions. Also for example, various subcomponents and subroutines may be shared between the functional blocks (e.g., various signal processing subcomponents or subroutines, like signal processing routines, filtering routines, matrix operation routines, etc.). Accordingly, the scope of various aspects of the present invention should not be limited by characteristics of any particular hardware or software implementation or by arbitrary boundaries between components or modules unless explicitly claimed.

Additionally, various aspects of the present invention may be implemented in any of a variety of components or systems. For example and without limitation, various aspects of the present invention may be incorporated in an integrated circuit (e.g., a baseband processor). Also for example, various aspects of the present invention may be integrated into a circuit module that is buildable or insertable into another system (e.g., a portable computer, mobile telephone and/or videophone, personal digital assistant, portable music device, portable email device, desktop computer, etc.). Accordingly, the scope of various aspects of the present invention should not be limited by characteristics of particular implementations or utilizations.

In summary, various aspects of the present invention provide a system and method for providing PHY layer signal processing that includes PHY layer signal processing modules that may be shared for communication with a plurality of different types of communication networks communicating utilizing a plurality of different communication protocols.

While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:
1. A system comprising:
a communication module configured to:
receive a physical ("PHY") layer signal;
analyze the PHY layer signal itself to determine a non-content characteristic of the PHY layer signal itself;
analyze the non-content characteristic of the PHY layer signal itself;

determine a particular communication protocol for processing the PHY layer signal based on the non-content characteristic of the PHY layer signal itself;

when the particular communication protocol is a first communication protocol:
process the PHY layer signal using a first operating mode to obtain a processed PHY layer signal, the first operating mode for processing the PHY layer signal in the communication module according to the first communication protocol; and when the particular communication protocol is a second communication protocol:
process the PHY layer signal using a second operating mode to obtain a processed PHY layer signal, the second operating mode for processing the PHY layer signal in the communication module according to the second communication protocol; and output the processed PHY layer signal.

2. The system of claim 1, where the communication module is configured to process the PHY layer signal by performing a signal processing operation on the PHY layer signal in multiple manners according to the first communication protocol when processing the PHY layer signal using the first operating mode and according to the second communication protocol when processing the PHY layer signal using the second operating mode.

3. The system of claim 1, further comprising a transceiver module, communicatively coupled to the communication module, configured to perform Multiple-Input-Multiple-Output Radio Frequency processing on the PHY layer signal according to the first communication protocol when processing the PHY layer signal using the first operating mode and according to the second communication protocol when processing the PHY layer signal using the second operating mode.

4. The system of claim 1, where the communication module comprises a Fast Fourier Transform ("FFT") engine configured to perform FFT processing on the PHY layer signal according to the first communication protocol when processing the PHY layer signal using the first operating mode and according to the second communication protocol when processing the PHY layer signal using the second operating mode.

5. The system of claim 1, where the communication module comprises a Multiple-Input-Multiple-Output ("MIMO") processor configured to perform MIMO demodulation processing, equalization processing, or both on the PHY layer signal according to the first communication protocol when processing the PHY layer signal using the first operating mode and according to the second communication protocol when processing the PHY layer signal using the second operating mode.

6. The system of claim 1, where the communication module comprises a symbol mapper configured to perform symbol mapping on the PHY layer signal according to the first communication protocol when processing the PHY layer signal using the first operating mode and according to the second communication protocol when processing the PHY layer signal using the second operating mode.

7. The system of claim 1, where the communication module comprises a Viterbi decoder configured to perform Viterbi decoding on the PHY layer signal according to the first communication protocol when processing the PHY layer signal using the first operating mode and according to the second communication protocol when processing the PHY layer signal using the second operating mode.

8. The system of claim 1, where the communication module comprises:
a Digital-to-Analog Converter ("DAC") configured to perform DAC processing on the PHY layer signal according to the first communication protocol when processing the PHY layer signal using the first operating mode and according to the second communication protocol when processing the PHY layer signal using the second operating mode,
an Analog-to-Digital Converter ("ADC") configured to perform ADC processing on the PHY layer signal according to the first communication protocol when processing the PHY layer signal using the first operating mode and according to the second communication protocol when processing the PHY layer signal using the second operating mode,
or both.

9. The method of claim 1, where the non-content characteristic of the PHY layer signal itself comprises an encoding type of the PHY layer signal.

10. The method of claim 1, where the non-content characteristic of the PHY layer signal itself comprises a modulation type of the PHY layer signal.

11. A method comprising:
in a communication device:
receiving a physical ("PHY") layer signal;
analyzing the PHY layer signal itself to determine a non-content characteristic of the PHY layer signal itself;
analyzing the non-content characteristic of the PHY layer signal itself;
determining a communication protocol for processing the PHY layer signal based on the non-content characteristic of the PHY layer signal itself;
processing the PHY layer signal according to the communication protocol to obtain a processed PHY layer signal by:
when the communication protocol is a first communication protocol:
processing the PHY layer signal using a first operation mode to obtain the processed PHY layer signal, the first operating mode for processing the PHY layer signal according to the first communication protocol; and when the communication protocol is a second communication protocol:
processing the PHY layer signal using a first operation mode a second operating mode different from the first operating mode to obtain the processed PHY layer signal, the second operating mode for processing the PHY layer signal according to the second communication protocol; and outputting the processed PHY layer signal.

12. The method of claim 11, where processing the PHY layer signal comprises performing, according to the first communication protocol when processing the PHY layer signal using the first operating mode and according to the second communication protocol when processing the PHY layer signal using the second operating mode, demodulation processing, equalization processing, time domain correction processing, Fast Fourier Transform processing, symbol mapping, Viterbi decoding, or any combination thereof.

13. The method of claim 11, where processing the PHY layer signal comprises performing, according to the first communication protocol when processing the PHY layer signal using the first operating mode and according to the second communication protocol when processing the PHY layer signal using the second operating mode, Digital-to-Analog processing, Analog-to-Digital processing, or both.

14. The method of claim 11, where the non-content characteristic of the PHY layer signal itself comprises an encoding type of the PHY layer signal.

15. The method of claim 11, where the non-content characteristic of the PHY layer signal itself comprises a modulation type of the PHY layer signal.

16. A system comprising:
an input module configured to receive a physical ("PHY") layer signal;
an output module configured to output a processed PHY layer signal; and
a signal processing module, in communication with the input module and the output module, configured to:
analyze the PHY layer signal itself to determine a non-content characteristic of the PHY layer signal itself;
analyze the non-content characteristic of the PHY layer signal itself;
determine a communication protocol for processing the PHY layer signal based on the non-content characteristic of the PHY layer signal; and
process the PHY layer signal to obtain a processed PHY layer signal by:
when the communication protocol is a first communication protocol:
processing the PHY layer signal using a first operating mode to obtain the processed PHY layer signal, the first operating mode for processing the PHY layer signal in the signal processing module according to the first communication protocol; and
when the communication protocol is a second communication protocol:
processing the PHY layer signal using a second operating mode different from the first operating mode to obtain the processed PHY layer signal, the second operating mode for processing the PHY layer signal in the signal processing module according to the second communication protocol.

17. The system of claim 16, where the signal processing module is configured to process the PHY layer signal by:
when the communication protocol is the first communication protocol:
processing the PHY layer signal using the first operating mode by performing, according to the first communication protocol, demodulation processing, equalization processing, time domain correction processing, Fast Fourier Transform processing, symbol mapping, Viterbi decoding, or any combination thereof; and
when the communication protocol is the second communication protocol:
processing the PHY layer signal using the second operating mode by performing, according to the second communication protocol, demodulation processing, equalization processing, time domain correction processing, Fast Fourier Transform processing, symbol mapping, Viterbi decoding, or any combination thereof.

18. The system of claim 16, where the non-content characteristic of the PHY layer signal itself comprises an encoding type of the PHY layer signal.

19. The system of claim 16, where the non-content characteristic of the PHY layer signal itself comprises a modulation type of the PHY layer signal.

* * * * *